United States Patent [19]
Zahm et al.

[11] Patent Number: 5,867,122
[45] Date of Patent: Feb. 2, 1999

[54] APPLICATION OF GPS TO A RAILROAD NAVIGATION SYSTEM USING TWO SATELLITES AND A STORED DATABASE

[75] Inventors: Charles Zahm, Indialantic; William Matheson, Palm Bay, both of Fla.

[73] Assignee: Harris Corporation, Melbourne, Fla.

[21] Appl. No.: 733,963

[22] Filed: Oct. 23, 1996

[51] Int. Cl.⁶ .............................. H04B 7/185; G01S 5/02
[52] U.S. Cl. ........................... 342/357; 701/217; 701/221
[58] Field of Search ........................ 342/357; 364/449.7, 364/450; 701/214, 221, 217

[56] References Cited

U.S. PATENT DOCUMENTS

| | | | |
|---|---|---|---|
| 5,129,605 | 7/1992 | Burns et al. | 246/5 |
| 5,541,845 | 7/1996 | Klein | 342/357 |

*Primary Examiner*—Theodore M. Blum
*Attorney, Agent, or Firm*—Rogers & Killeen

[57] ABSTRACT

A method for determining the location of a vehicle whose movement is constrained to a route whose location is fixed and known, such as a train. An initial estimate of location is made based upon information contained in a route database based on distance traveled from a reset point. The accuracy of the estimated vehicle location is improved through use of just two global positioning satellites.

19 Claims, 1 Drawing Sheet

APPLICATION OF GPS TO A RAILROAD NAVIGATION SYSTEM USING TWO SATELLITES AND A STORED DATABASE

BACKGROUND OF THE INVENTION

The present invention relates to the determination of the location of an object through the combined use of a route database and satellite measurement. More specifically, the invention relates to location determination of a train through the use of a track database and data from just two global positioning satellites.

The ability to locate trains across a wide area is becoming of increasing importance. Resource limitations inherent in any track system such as the number and availability of sidings, loaders, unloaders, switches, and personnel make the intelligent use of such resources of utmost importance. These resources are best used through the efficient transit of trains to and from these resources. Efficient transit can only be accomplished if the locations of the various trains in the system are known with accuracy.

The Global Positioning System (GPS) and other satellite based location determining systems have been available and in use for a number of years (the term GPS is used hereafter to denote any positioning system which uses satellites and has capabilities similar to those of the GPS system.) Use of GPS systems with a wide variety of vehicles, including trains, is known to the field. Also known to the field are the inherent limitations of GPS use.

An accurate GPS location determination requires a GPS receiver to receive signals from four different GPS satellites. A train or any other vehicle can easily receive signals from the four required satellites if the vehicle is located in an open area, free of signal obstructions. For this reason, ships at sea and airplanes in flight are well positioned to make full use of GPS to accurately determine their location. A train located in an open area can similarly receive signals from the required four satellites. However, trains are not always so conveniently located.

The very nature of train travel is such that trains will be found in locations where they cannot easily receive from four satellites. Trains travel next to tall, signal obstructing structures, both natural and man-made. Trains travel through canyons and other areas which interfere with signal reception. As such, trains are often in the situation, unique from some other forms of mass and freight transit, in which they can receive signals from fewer than the required four satellites, and frequently can receive signals from only two satellites.

Obviously, there are other methods for determining the location of a vehicle. Particularly with respect to rail-based transportation, it is possible for a vehicle to have access to a database of information pertaining to rail routes whose locations are fixed and known. Such a database may be used to provide a way of converting elapsed distance from a known point along a known route into a location in two or three dimensional coordinates.

Such a system is well suited to rail vehicles by virtue of the fact that these vehicles cannot stray from their fixed and known tracks. The advantages of such a system are limited by its logistics, however. In order to know the distance traveled from a fixed point, an odometer type of measurement must be taken. Such a measurement is generally taken by counting wheel rotations, which is fraught with inaccuracies: wheels slip on rails, potentially both during acceleration and braking; wheel diameter changes over time as wheels wear down and develop flat spots; any wheel rotation measurement and calculation method is inherently at least partly mechanical, thus subject to mechanical problems; all such measurements are based on correctly resetting a counter at a designated zero point from which such measurements are taken, which might not be easily performed; and independent of the ability to measure distance travelled, the entire system is subject to the accuracy of the initial database upon which the final location determination is based.

It is desirable to combine the best features of satellite based and elapsed distance based location determination methods. Such a system could approximate a rail vehicle's location based on a track database to within some range of error. This estimate could be used as the basis for a satellite based measurement which takes into account not only the estimated location of the rail vehicle, but also the relative location of nearby geosynchronous satellites. Such a system need not have access to the full four satellites normally required.

Accordingly, it is an object of the present invention to provide a novel method of determining the location of a vehicle whose movement is constrained to a route whose location is fixed and known which obviates the problems of the prior art.

It is a further object of the present invention to provide a novel method of determining a vehicle's location along a fixed route by using a database of route locations in conjunction with positional information from just two satellites from a global positioning system.

It is another object of the present invention to provide a novel method of determining the location of a vehicle by estimating the vehicle's location along a route, determining angles from a vector tangent to the route to each of two satellites, determining range errors between an estimated range from the estimated location of the vehicle to each satellite and a measured range from the vehicle to each satellite, and using the determined angles and determined range errors to determine a distance error which is combined with the estimated location of the vehicle to determine its location.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
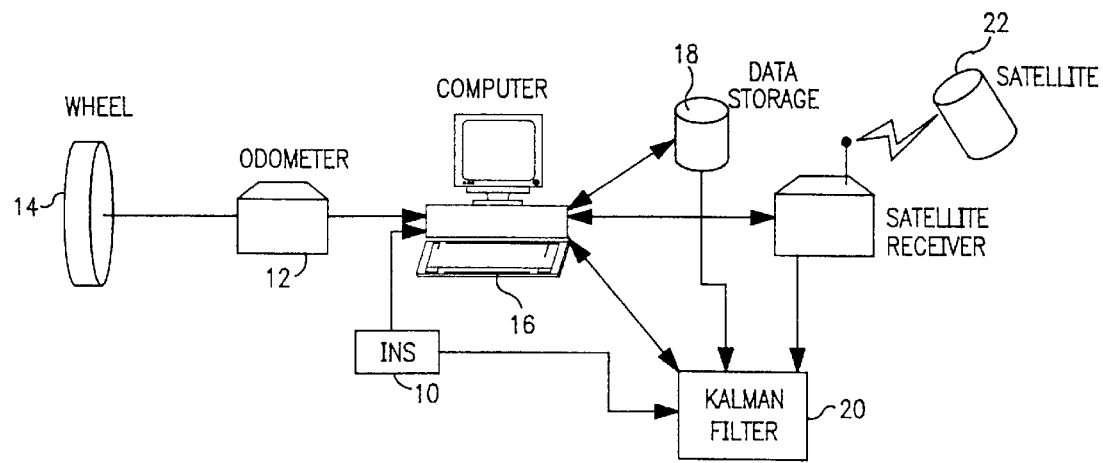
FIG. 1 is a high level representation of the elements of a location determination system in which the present invention may be realized.

In accordance with the present invention, a vehicle whose movement is constrained to a route whose location is fixed and known may be equipped with a route database. Such a route database may provide the means of converting elapsed distance from a known point along the route to an estimated location in two or three dimensions. This estimate may also be used to estimate the pseudoranges of nearby satellites. This satellite range estimate may be used to accurately determine the vehicle's location using as few as two satellites.

The relationship between the location of each satellite and a vehicle can be expressed as:

$$P_i = [(X_i - X_l)^2 + (Y_i - Y_l)^2 + (Z_i - Z_l)^2]^{1/2} + Bc, \quad i = 1, \ldots, n$$

where:

$X_i$, $Y_i$, $Z_i$ represent the location in three dimensions of each satellite i;

$X_l$, $Y_l$, $Z_l$ represent the location in three dimensions of the vehicle;

B represents the receiver clock bias (and c is a known or determinable constant);

$P_i$ represents the pseudorange from the satellite receiver in the vehicle to satellite i; and n represents the number of satellites used in the solution, which must be greater than or equal to four if $X_l$, $Y_l$, $Z_l$, and B are unknown.

Let $\hat{X}_l$, $\hat{Y}_l$, $\hat{Z}_l$ and $\hat{B}$ be the best estimate of these parameters. Thus:

$$X_l = \hat{X}_l + \Delta X_l$$
$$Y_l = \hat{Y}_l + \Delta Y_l$$
$$Z_l = \hat{Z}_l + \Delta Z_l$$
$$B = \hat{B} + \Delta B$$
$$P_i = \hat{P}_i + \Delta P_i$$

Substituting these parameters into the above equation and linearizing, we obtain:

$$\delta \rho_i = A_{x_i} \Delta X_l + A_{y_i} \Delta Y_l + A_{z_i} \Delta Z_l - C \Delta B = \rho_i - \hat{\rho}_i - c b_i$$

where $$A_{x_{l_i}} = -\frac{(X_i - \hat{X}_l)}{\hat{\rho}^i}$$

$$A_{y_{l_i}} = -\frac{(Y_i - \hat{Y}_l)}{\hat{\rho}^i}$$

$$A_{z_{l_i}} = -\frac{(Z_i - \hat{Z}_l)}{\hat{\rho}^i}$$

and $b_i$ is the error in the satellite clock.

These linearized equations can be put into matrix form and appear as:

$$\begin{bmatrix} A_{x_{l_1}} & A_{y_{l_1}} & A_{z_{l_1}} & -c \\ A_{x_{l_2}} & A_{y_{l_2}} & A_{z_{l_2}} & -c \\ A_{x_{l_3}} & A_{y_{l_3}} & A_{z_{l_3}} & -c \\ \cdot & \cdot & \cdot & \cdot \\ \cdot & \cdot & \cdot & \cdot \\ \cdot & \cdot & \cdot & \cdot \end{bmatrix} \begin{bmatrix} \Delta X \\ \Delta Y \\ \Delta Z \\ \Delta B \end{bmatrix} = \begin{bmatrix} \delta \rho_1 \\ \delta \rho_2 \\ \delta \rho_3 \\ \cdot \\ \cdot \\ \cdot \end{bmatrix}$$

These are the "normal" linearized equations which are iterated to obtain a GPS solution.

Given that we have a route data base which is very accurate, it is evident that vehicle location $X_l$, $Y_l$, and $Z_l$ can be parameterized in terms of the distance along the route ("s"). That is $X_l = X_l(s)$, $Y_l = Y_l(s)$, and $Z_l = Z_l(s)$.

Hence:

$$\Delta X = \frac{dx}{ds} \Delta s, \quad \Delta Y = \frac{dy}{ds} \Delta s, \quad \Delta Z = \frac{dz}{ds} \Delta s$$

Substituting these values into the linearized equations we obtain:

$$\begin{bmatrix} A_{x_{l_1}} \frac{dx}{ds} + A_{y_{l_1}} \frac{dx}{ds} + A_{z_{l_1}} \frac{dx}{ds} & -c \\ A_{x_{l_2}} \frac{dx}{ds} + A_{y_{l_2}} \frac{dx}{ds} + A_{z_{l_2}} \frac{dx}{ds} & -c \\ A_{x_{l_3}} \frac{dx}{ds} + A_{y_{l_3}} \frac{dx}{ds} + A_{z_{l_3}} \frac{dx}{ds} & -c \\ \cdot & \cdot \\ \cdot & \cdot \\ \cdot & \cdot \end{bmatrix} \begin{bmatrix} \Delta s \\ \Delta B \end{bmatrix} = \begin{bmatrix} \Delta \rho_1 \\ \delta \rho_2 \\ \delta \rho_3 \\ \cdot \\ \cdot \\ \cdot \end{bmatrix}$$

The following are unit vectors in the direction to the satellite and of the route, respectively:

$$[A_{x_{l_i}} A_{y_{l_i}} A_{x_{l_i}}]^T \text{ and } \begin{bmatrix} \frac{dx}{ds} & \frac{dy}{ds} & \frac{dz}{ds} \end{bmatrix}^T$$

The inner product of these two vectors is, $$A_{x_{l_i}} \frac{dx}{ds} + A_{y_{l_i}} \frac{dy}{ds} + A_{z_{l_i}} \frac{dz}{ds}$$

which represents the cosine of the angle between the two vectors. The simplified equation that is used to determine vehicle location thus becomes:

$$\begin{bmatrix} \cos\theta_1 & -c \\ \cos\theta_2 & -c \\ \cos\theta_3 & -c \\ \cdot & \cdot \\ \cdot & \cdot \\ \cdot & \cdot \end{bmatrix} \begin{bmatrix} \Delta s \\ \Delta B \end{bmatrix} = \begin{bmatrix} \delta \rho_1 \\ \delta \rho_2 \\ \delta \rho_3 \\ \cdot \\ \cdot \\ \cdot \end{bmatrix}$$

It is clear from the preceding description that since the number of unknowns has been reduced to two ($\Delta s$ and $\Delta B$), the number of satellites required for to determine a location, given that the vehicle is on the route is two.

To ascertain the accuracy that can be obtained using this method, it is an easy calculation to show that the dilution of precision in three dimensions (PDOP) along the route is given by:

$$PDOP_s = \left[ \frac{n}{n \Sigma (\cos\theta_i)^2 - \left( \sum_{i=1}^{n} \cos\theta_i \right)^2} \right]^{1/2}$$

where n represents the number of satellites used in the solution. In order to minimize the PDOP, it is best if the satellites lie in front and to the rear of the train.

With reference now to FIG. 1, the present invention may include a conventional dead reckoning navigation system utilizing a Kalman filter to provide an estimated location of a vehicle on a fixed and known route (i.e., that is, vehicle movement is constrained to a route of fixed and known location.) The dead reckoning system may be an inertial navigation system (INS) 10 or odometer 12 connected to a wheel 14 moving along the route, or other system for providing a distance along the route. Odometer 12 may count the rotations of vehicle wheel 14 and convert the number of rotations into an elapsed distance from the last odometer reset point along the route. The estimated location along the route from the dead reckoning system may be provided to a computer 16.

A conventional data storage 18 may contain a database of two or three dimensional coordinates for vehicle locations along the route that are retrievable based on the information provided from the dead reckoning system (e.g., distance from the last reset point.) Data storage 18 may also contain information concerning the locations of GPS satellites (although the invention is not limited to the GPS system.) Data storage 18 may be colocated with computer 16 or remote therefrom and connected via radio or other conventional data link systems. A satellite receiver 20 may receive transmissions from a plurality of satellites 22 and provide information from the transmissions to computer 16.

Computer 16 may be used to make an accurate determination of the present location of the vehicle. Upon operator request or automatically (such as periodically or at preset times), computer 16 may read the estimated location from the dead reckoning system, and obtain coordinates for that location from database 18. Using the coordinates for the estimated location along the route, computer 16 may query satellite receiver 20 for location information based on signals received from as few as two satellites 22. Using the relationships derived above, computer 16 may then derive a very accurate estimate of the present location of the vehicle and display it on computer 16 and/or provide it to a central facility which monitors and/or controls vehicle location along the route.

Figure 2:
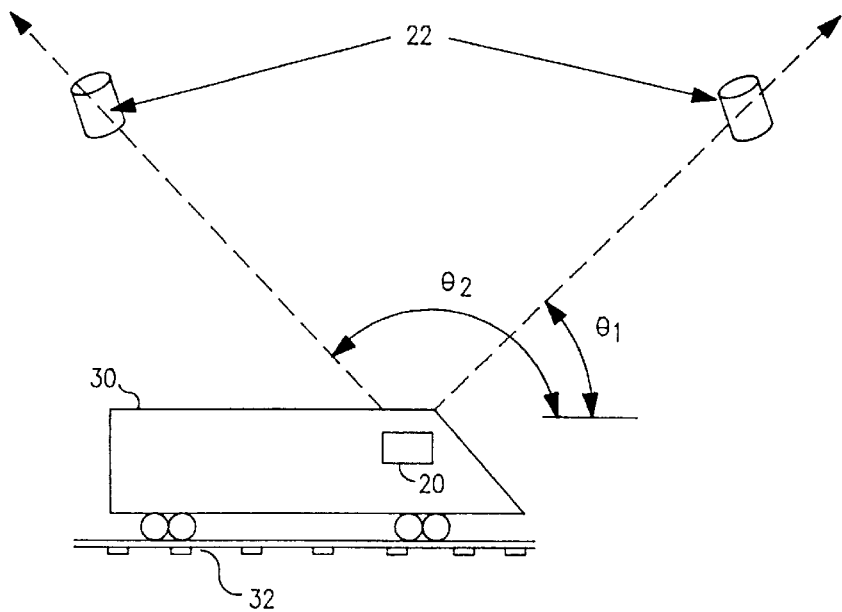
FIG. 2 is a representation of the geometric relationship between a vehicle equipped with a satellite receiving apparatus and two satellites located above.

According to the preferred embodiment and with reference to FIG. 2, once a locomotive 30 location ($\hat{X}_l, \hat{Y}_l, \hat{Z}_l$) on a track 32 has been estimated using the dead reckoning system, the unit vector tangent to track 32 at the estimated location may be calculated, as well as the unit vector to each satellite. The angles $\theta_i$ between the track tangent unit vector and each satellite's unit vector may then be determined. Next, the estimated pseudorange ($\hat{P}_i$) to each satellite may be determined based on the locomotive's estimated location, and the measured pseudorange ($P_i$) to each satellite from the satellite receiver may be determined. The pseudorange error ($\delta P_i$) may be computed by subtracting the estimated pseudorange from the measured pseudorange. Thus with $\theta_i$ and $\delta P_i$ known for two satellites, $\Delta s$ and $\Delta B$ may be calculated using the simplified equation above which is repeated below for just two satellites.

$$\begin{bmatrix} \cos\theta_1 - c \\ \cos\theta_2 - c \end{bmatrix} \begin{bmatrix} \Delta s \\ \Delta B \end{bmatrix} = \begin{bmatrix} \delta\rho_1 \\ \delta\rho_2 \end{bmatrix}$$

The results may be accepted if the norm of $[\Delta s \Delta B]^T$ is less than a predetermined threshold, or rejected and the process repeated if the norm exceeds the threshold.

Preferably one of the two satellites is forward of the direction of motion of the locomotive and the other satellite is rearward thereof. The two satellites should not lie in a plane which contains the locomotive and which is orthogonal to the track.

In a further embodiment, the system herein may be used to monitor the location of the end of a train by installing the system at the rear of a train in addition to, or instead of, the train locomotive.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A method of determining the location of a vehicle whose movement is constrained to a route whose location is fixed and known, comprising the steps of:
   (a) estimating the vehicle's location along the route;
   (b) receiving signals from two global position satellites;
   (c) determining an angle from a vector tangent to the route at the estimated location to each of the two satellites;
   (d) for each of the two satellites, determining a range error between an estimated range from the estimated location of the vehicle to the satellite and a measured range from the vehicle to the satellite;
   (e) using the determined angles and determined range errors for only the two satellites, determining a distance error in the estimated location of the vehicle along the route; and
   (f) combining the distance error with the estimated location to provide a determined location of the vehicle along the route.

2. The method of claim 1 wherein the method further comprises the step of selecting one of the satellites forward of the vehicle's direction of movement and the other of the satellites rearward thereof.

3. The method of claim 1 wherein the step of estimating the vehicle's location along the route comprises the step of using a dead reckoning system to estimate a location along the route.

4. The method of claim 1 wherein the step of determining a distance error in the estimated location of the vehicle along the route comprises the step of solving the following, where the distance error is $\Delta s$, the determined angles are $\theta_i$, the determined range errors are $\delta P_i$, c is a constant and $\Delta B$ is an unknown:

$$\begin{bmatrix} \cos\theta_1 - c \\ \cos\theta_2 - c \end{bmatrix} \begin{bmatrix} \Delta s \\ \Delta B \end{bmatrix} = \begin{bmatrix} \delta\rho_1 \\ \delta\rho_2 \end{bmatrix}$$

5. The method of claim 4 further comprising the steps of determining the norm of $[\Delta s \Delta B]^T$, and accepting the determined distance error if the determined norm is less than a threshold amount.

6. The method of claim 1 further comprising the steps of computing a route unit vector that is tangent to the route at the estimated location, and computing satellite unit vectors from the estimated location to each of the two satellites, wherein the determined angles are between the route unit vector and the satellite unit vectors.

7. The method of claim 1 wherein the vehicle is a train locomotive with a GPS receiver and the route is a track for the locomotive.

8. The method of claim 7 further comprising the step of providing the determined position to a train operator remote from the locomotive which monitors locomotive location.

9. The method of claim 1 wherein the vehicle is at an end of a train, the vehicle having a GPS receiver, and the route is a track for the train.

10. The method of claim 9 further comprising the step of providing the determined position to a train operator remote from the train which monitors end-of-train location.

11. A method of determining the location of a vehicle which moves along a route whose location is known, and which has a positioning satellite receiver, the method comprising the steps of:
(a) estimating a location of the vehicle using information about the known route and movement of the vehicle;
(b) improving the accuracy of the estimated location by applying a correction to the estimated location derived from data received on the positioning satellite receiver from just two positioning satellites; and
(c) determining an angle from a vector tangent to the route at the estimated location to each of the two satellites by computing a route unit vector that is tangent to the route at the estimated location, and computing satellite unit vectors from the estimated location to each of the two satellites, wherein the determined angles are between the route unit vector and the satellite unit vectors.

12. The method of claim 11 further comprising the step of: for each of the two satellites, determining a range error between an estimated range from the estimated location of the vehicle to the satellite and a measured range from the vehicle to the satellite.

13. The method of claim 12 further comprising the step of: determining a distance error in the estimated location of the vehicle along the route by solving the following, where the distance error is $\Delta s$, the determined angles are $\theta_i$, the determined range errors are $\delta P_i$, c is a constant and $\Delta B$ is an unknown:

$$\begin{bmatrix} \cos\theta_1 - c \\ \cos\theta_2 - c \end{bmatrix} \begin{bmatrix} \Delta s \\ \Delta B \end{bmatrix} = \begin{bmatrix} \delta\rho_1 \\ \delta\rho_2 \end{bmatrix}$$

14. The method of claim 11 wherein the vehicle is in a train and the route is a track for the train.

15. The method of claim 14 further comprising the step of providing the determined position to a train operator remote from the train which monitors train location.

16. A method of determining the location of a vehicle which moves along a known route, and which has a positioning satellite receiver, the method comprising the steps of:
(a) estimating a location of the vehicle using information about the known route and movement of the vehicle; and
(b) improving the accuracy of the estimated location by applying a correction to the estimated location derived from data continuously received by the positioning satellite receiver from a plurality of positioning satellites, the step of improving including the determination of the angle from a vector tangent to the route at the estimated location to each of the satellites.

17. The method of claim 16 wherein the step of improving comprises the step of selecting data for the correction from one satellite forward of the vehicle's direction of movement and from one satellite rearward thereof.

18. The method of claim 16 wherein the step of estimating the vehicle's location along the route comprises the step of using a dead reckoning system to estimate a location along the route.

19. The method of claim 16 wherein the step of improving further includes the steps of:
(a) for each of the satellites, determining a range error between an estimated range from the estimated location of the vehicle to the satellite and a measured range from the vehicle to the satellite;
(b) using the determined angles and determined range errors for the satellites, determining a distance error in the estimated location of the vehicle along the route; and
(c) combining the distance error with the estimated location to provide a determined location of the vehicle along the route.

* * * * *